J. S. SHARP.
HOSE CONNECTION FOR LAWNS.
APPLICATION FILED MAY 26, 1910.
1,064,862.
Patented June 17, 1913.
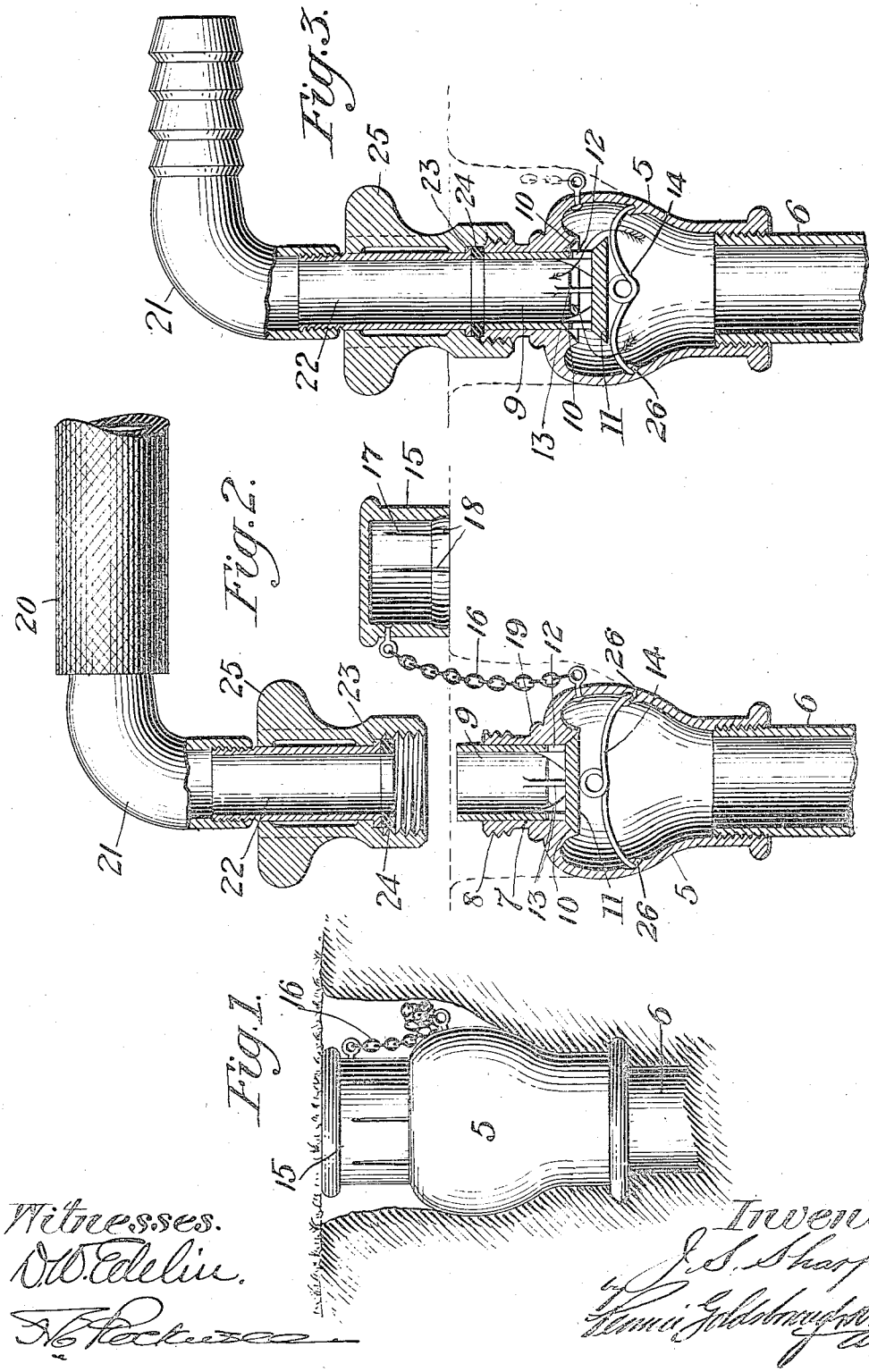

UNITED STATES PATENT OFFICE.

JAMES STUART SHARP, OF HONOLULU, TERRITORY OF HAWAII.

HOSE CONNECTION FOR LAWNS.

1,064,862.

Specification of Letters Patent.

Patented June 17, 1913.

Application filed May 26, 1910. Serial No. 563,474.

*To all whom it may concern:*

Be it known that I, JAMES STUART SHARP, a citizen of the United States, and resident of Honolulu, county of Honolulu, Territory of Hawaii, have invented certain new and useful Improvements in Hose Connections for Lawns; and I do hereby declare the following to be a full, clear, and exact description of the invention, such as will enable others skilled in the art to which it appertains to make and use the same.

This invention relates to hose connections for lawns of the type embodying a valved fixture set in the sod and properly connected with the water supply pipe, the hose being capable of connection to and detachment from said fixture in the well known manner.

The object of this invention is to furnish a device of this kind which can be placed below the level of the ground, so that it will not mar the appearance of the lawn and in order that it will not interfere with the cutting of the grass by lawn mowers or other cutting instruments, which is often a marked disadvantage of fixtures at present used for this purpose. In order that this location of the fixture may not interfere with the easy operation of the water-controlling valve, the latter is opened automatically when the hose is coupled to the fixture, and as soon as the hose is disconnected, the valve closes of itself, thereby cutting off the flow of water. Connection between the valve fixture and the hose is preferably made by means of a swivel joint, preventing the kinking of the hose and permitting its attachment to the valved fixture without inconvenience, as will appear from the following description.

In the accompanying drawing, Figure 1 is a side elevation of a lawn fixture embodying the invention, shown in position in the ground, Fig. 2 is a vertical sectional view of the valved fixture and the hose connection, shown as separated from each other, and Fig. 3 is a view corresponding to Fig. 2, but showing the hose coupled to the valved fixture.

In carrying out the invention, the valved fixture comprises a casing 5, which is sunk in the ground, as shown in Fig. 1, and connected with the water supply pipe 6, which is threaded into such casing or otherwise connected thereto. The casing is open at the top and reduced in cross section and its upper edge is preferably set slightly below the ground level, although it may be substantially flush with the same. This reduced upper part of the casing, denoted by reference character 7, is threaded exteriorly, as shown at 8, and it serves to guide in a vertical direction a valve 9 coöperating with a valve seat 10 in the casing. This valve seat is preferably formed by an annular shoulder suitably beveled, as shown, and formed integral with the casing wall.

The valve 9 is preferably of cylindrical or sleeve-like shape, as shown, and its bottom is closed by a disk or plate 11 beveled to coact with the seat 10. A spring 14 of special shape urges the valve upward and holds it in engagement with said seat, in which position the upper end of the valve projects out of the valve casing, as shown in Fig. 2. I prefer to use a spring consisting of a piece of spring wire or plate having a looped intermediate portion bearing against the bottom of the valve and seated at its ends in notches formed by projections 26 on the inner surface of the casing wall, as shown. In the side wall of the valve body, above the disk or plate 11, are openings 12 which are uncovered by the pressing down of the valve away from its seat, as shown in Fig. 3, to permit the escape of water from the valve casing and into the hose. Ribs 13 are arranged between the openings 12 and form a sort of spider supporting the valve bottom 11.

I prefer to cover the valved fixture when not in use with a cap 15, which may be conveniently attached to the valve casing by means of a chain 16 or the like, to prevent the loss of said cap. The side wall of the latter is preferably provided with a series of slits 17 to permit its being sprung over the open upper end of the casing 5, so that it will be snugly held in position. When placed on the casing, the cap grips the same by means of a groove 18 in the inner surface of its side wall, at the lower edge thereof, which groove takes a bead 19 formed on the casing below the threads 8. In this way, the engagement of the cap with the screw threads may be avoided.

In order to secure the hose 20 to the valve casing, the former may be provided with an elbow 21, into which is screwed a sleeve 22, carrying at its free end a gasket 24. Said free end of the sleeve is provided with a lateral flange 23, and between said flange and the lower end of the elbow 21 the outer surface of the sleeve forms a bearing for a swiveled or rotatable nipple 25, threaded interiorly to screw on the mouth or nozzle of the casing, around the valve 9.

When the hose is to be connected to the valve casing, the elbow 21 and sleeve 22 are held against turning, while the nipple 25 is screwed down on the casing nozzle. This carries the sleeve 22 downward with its gasket 23 against the upper end of the valve 9, which results in moving the valve downward and away from its seat. The sleeve 22 finally comes to rest against the upper edge of the casing nozzle, as shown in Fig. 3, the length of the valve being so chosen that it is unnecessary for said sleeve to extend downward into the nozzle. Water may then pass out into the hose through the openings 12 in the valve, and the hose will be supplied with water as long as it is connected with the valved fixture. The opening of the valve is therefore caused automatically by the application of the hose to the valve casing. When the hose is disconnected the spring 14 immediately closes the valve again, as will be understood. Hence no manual manipulation of the valve is necessary either to turn on the water or to cut it off; all that is necessary is to screw the hose on to the valved fixture and to detach it therefrom, and these, of course, are extremely simple operations which can be effected in a very short space of time and are not interfered with by the location of the valved fixture below the ground level.

Although I have described my invention as employed in connection with the watering of lawns, it is obvious that the device may be used to advantage for other purposes. I also wish it to be understood that I do not wish to limit myself to the construction shown in the drawing and herein described, for that is only one of the many possible embodiments of the invention, the scope of which is defined in the claim.

What I claim is:—

The combination with a valve casing having an exteriorly threaded nozzle at the top, of a sleeve-like valve guided throughout its length in said nozzle, and provided with a bottom plate engageable with a shoulder in said casing, said sleeve-like valve projecting out of said nozzle when the valve is seated, a spring in said casing normally holding said bottom plate in engagement with the shoulder to close the valve, said spring extending across the casing above the bottom of the latter with its intermediate portion in engagement with the lower surface of the valve bottom and its ends supported by the side wall of the casing, and a hose attaching device comprising a rotary interiorly threaded nipple to screw on said nozzle and a fixed inner sleeve on which said nipple rotates, said sleeve adapted to engage the extremity of the sleeve-like valve when the nipple is secured on the nozzle to thereby unseat the valve.

In testimony whereof I affix my signature, in presence of two witnesses.

J. STUART SHARP.

Witnesses:
J. H. SCHNACK,
GEO. W. PATY.